United States Patent
Kang et al.

(10) Patent No.: US 9,648,536 B2
(45) Date of Patent: May 9, 2017

(54) APPARATUS AND METHOD FOR HANDOVER IN WIRELESS COMMUNICATION SYSTEM

(71) Applicants: Samsung Electronics Co., Ltd., Gyeonggi-do (KR); Korea Advanced Institute of Science and Technology, Daejeon (KR)

(72) Inventors: Hyun-Jeong Kang, Seoul (KR); Sung-Jin Park, Daejeon (KR); Byung-Chang Chung, Seoul (KR); Min-Hoe Kim, Daejeon (KR); Jung-Min Moon, Seoul (KR); Dong-Ho Cho, Seoul (KR)

(73) Assignees: SAMSUNG ELECTRONICS CO., LTD, Suwon-si, Gyeonggo-Do (KR); KOREA ADVANCED INSTITUTE OF SCIENCE AND TECHNOLOGY, Daejeon, Yuseong-Gu (KR)

( * ) Notice: Subject to any disclaimer, the term of this patent is extended or adjusted under 35 U.S.C. 154(b) by 77 days.

(21) Appl. No.: 14/025,551

(22) Filed: Sep. 12, 2013

(65) Prior Publication Data

US 2014/0073329 A1   Mar. 13, 2014

(30) Foreign Application Priority Data

Sep. 12, 2012  (KR) .................. 10-2012-0100918

(51) Int. Cl.
*H04W 36/30* (2009.01)
*H04W 36/14* (2009.01)
*H04W 36/12* (2009.01)
*H04W 16/28* (2009.01)
*H04W 36/00* (2009.01)

(52) U.S. Cl.
CPC .......... *H04W 36/30* (2013.01); *H04W 36/12* (2013.01); *H04W 36/14* (2013.01); *H04W 16/28* (2013.01); *H04W 36/00* (2013.01)

(58) Field of Classification Search
CPC ..... H04W 36/30; H04W 36/00; H04W 16/28; H04W 36/12; H04W 36/14
USPC ........................................... 455/439
See application file for complete search history.

(56) References Cited

U.S. PATENT DOCUMENTS

| | | | |
|---|---|---|---|
| 7,043,274 B2* | 5/2006 | Cuffaro | H04B 7/04 455/101 |
| 2004/0214606 A1* | 10/2004 | Wichman | H04B 7/0408 455/562.1 |
| 2008/0096561 A1* | 4/2008 | Liu | H04W 36/08 455/436 |
| 2009/0098874 A1 | 4/2009 | Goransson et al. | |
| 2009/0298502 A1 | 12/2009 | Hagerman et al. | |
| 2012/0106346 A1* | 5/2012 | Aguirre | H04W 28/08 370/237 |

* cited by examiner

*Primary Examiner* — Lester Kincaid
*Assistant Examiner* — William Wang

(57) ABSTRACT

A method for handover in a wireless communication system includes: when a received signal strength difference between a serving beam from a serving base station used for communication by a terminal and a target beam of a neighboring base station is equal to or greater than a first threshold value, and a received signal strength difference between an active beam and the target beam is equal to or greater than a second threshold value, determining a handover to the target beam; and transmitting a message to initiate the handover.

22 Claims, 17 Drawing Sheets

| LIST OF NEIGHBORING BASE STATION ID (810) | LIST OF NEIGHBORING BEAM ID (820) |
|---|---|
| . . . | . . . |
| ⋮ | ⋮ |
| . . . | . . . |

| LIST OF ACTIVE BEAM ID (830) |
|---|
| ⋮ |

FIG.8

APPARATUS AND METHOD FOR HANDOVER IN WIRELESS COMMUNICATION SYSTEM

PRIORITY

The present application is related to and claims priority under 35 U.S.C. §119 to an application filed in the Korean Intellectual Property Office on Sep. 12, 2012 and assigned Serial No. 10-2012-0100918, the contents of which are incorporated herein by reference.

TECHNICAL FIELD

The present disclosure relates to a wireless communication system.

BACKGROUND

As a technology for improving performance of a wireless communication system, beamforming is provided. Beamforming is a technique for increasing a signal reception strength for a specific receiver by giving directivity to a beam using multi-antennas. Beamforming is classified into transmission beamforming and reception beamforming according to which apparatus performs the beamforming. In this case, when a mobile station gets out of a serving cell and enters another cell, a handover procedure is performed. When base stations perform the beamforming, there is a problem of determining which beam is an optimal beam in a target base station.

As a handover procedure considering beams, a method for using the statistics of inter-beam handover success rates has been proposed as illustrated in FIG. 1. FIG. 1 illustrates a concept of handover using the statistics of inter-beam handover success rates in a wireless communication system. According to the handover method illustrated in FIG. 1, an administrator that manages a plurality of base stations directly controls the inter-beam handover of different base stations. Since the terminal does not know the narrow beam situations of all neighboring base stations, the administrator manages the inter-beam handover success rates using a lookup table 110. The administrator enables the terminal to perform a handover to an optimal target beam according to the success rates using the lookup table 110.

As another handover procedure considering beams, a method for using different beam widths has been proposed as illustrated in FIGS. 2A and 2B. FIGS. 2A and 2B illustrate a concept of handover using different beam widths in a wireless communication system. Referring to FIGS. 2A and 2B, a terminal receives a reference signal and determines a handover based on a channel quality measured through the reference signal. In this case, the reference signal for scanning is transmitted on a sector beam 201. A communication service is provided on a narrow beam 202.

Among the above-described handover methods, the method illustrated in FIG. 1 has an advantage in that the terminal is able to perform a handover without measurement for the narrow beam of a neighboring base station. However, there is a burden in that the administrator needs to manage handover success rates with respect to the beams of all base stations. In the method illustrated in FIGS. 2A and 2B, the terminal needs to transmit an uplink pilot signal to the base station with respect to narrow beam candidates. Therefore, as the number of narrow beam candidates increases, power consumption for determining an optimal narrow beam increases in a terminal.

Therefore, there is a need for an effective handover procedure considering beams.

SUMMARY

To address the above-discussed deficiencies of the related art, it is a primary object to provide an apparatus and method for performing a handover considering beamforming in a wireless communication system.

Certain embodiments of the present disclosure provide an apparatus and method for providing mobility of a terminal through beam scanning in a wireless communication system.

Certain embodiments of the present disclosure provide an apparatus and method for preventing a handover ping-pong phenomenon in a wireless communication system.

Certain embodiments of the present disclosure provide an apparatus and method for performing beam scanning considering a non line-of-sight (NLOS) environment in a wireless communication system.

According to certain embodiments of the present disclosure, a method for handover in a wireless communication system includes: when a received signal strength difference between a serving beam from a serving base station used for communication by a terminal and a target beam of a neighboring base station is equal to or greater than a first threshold value, and, a received signal strength difference between an active beam and the target beam is equal to or greater than a second threshold value, determining a handover to the target beam; and transmitting a message to initiate the handover. Herein the active beam is one of beams form the serving base station and has a received signal strength equal to or greater than a predefined lower limit value.

According to certain embodiments of the present disclosure, an apparatus for handover in a wireless communication system includes: a control unit configured to determine a handover to a target beam of a neighboring base station when a received signal strength difference between a serving beam from a serving base station used for communication by a terminal and the target beam is equal to or greater than a first threshold value, and, a received signal strength difference between an active beam and the target beam is equal to or greater than a second threshold value; and a communication unit configured to transmit a message to initiate the handover. Herein the active beam is one of beams form the serving base station and has a received signal strength equal to or greater than a predefined lower limit value.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example of a list for management of scanning results in a wireless communication system according to certain embodiments of the present disclosure;

DETAILED DESCRIPTION

FIGS. 3 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Exemplary embodiments of the present disclosure will be described herein below with reference to the accompanying drawings.

The present disclosure provides a handover technique considering beamforming in a wireless communication system.

Figure 1:
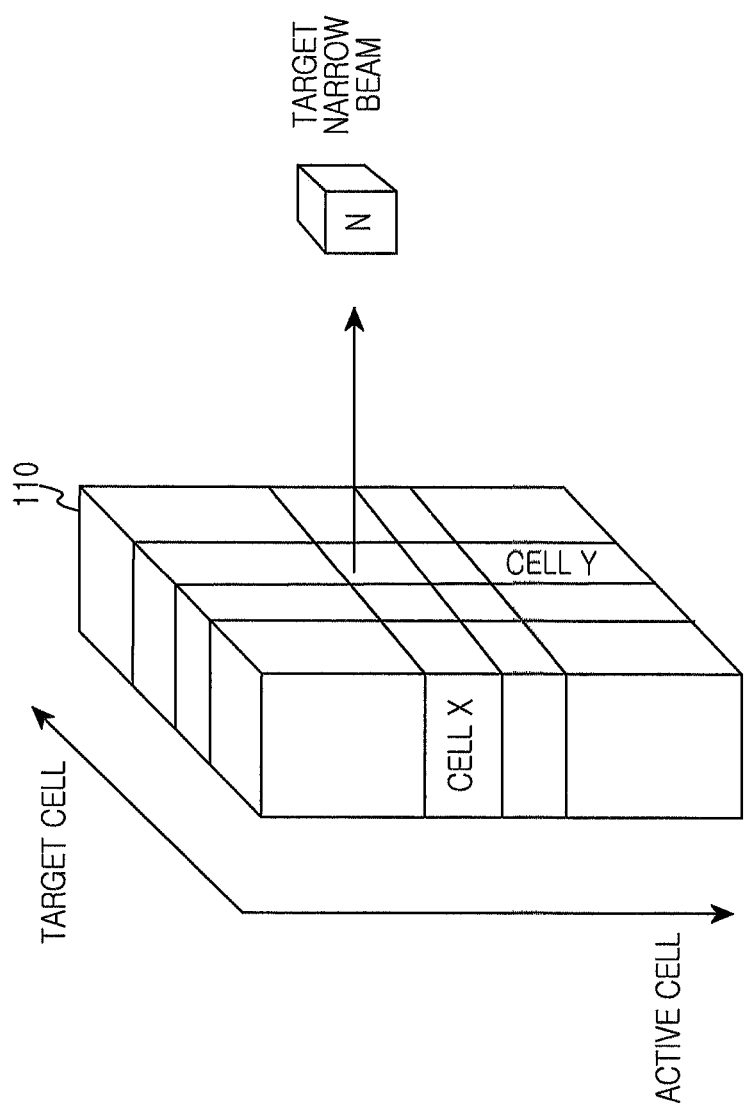
FIG. 1 illustrates a concept of handover using the statistics of inter-beam handover success rates in a wireless communication system.
Figure 2A:
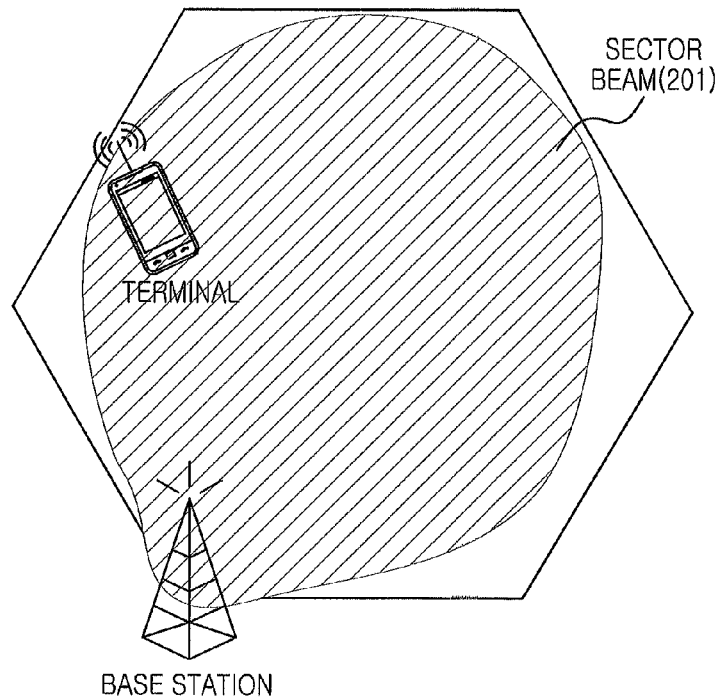
FIGS. 2A and 2B illustrate a concept of handover using different beam widths in a wireless communication system.
Figure 2B:
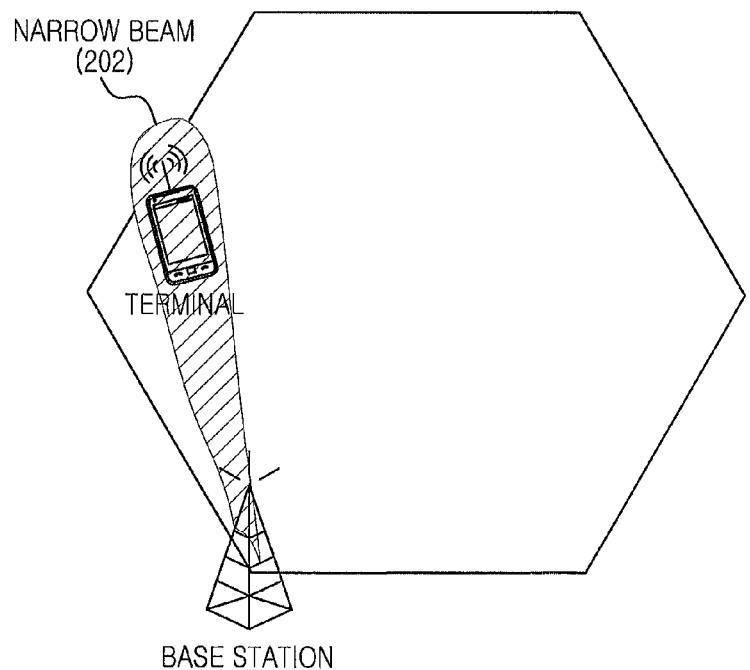
Figure 3:
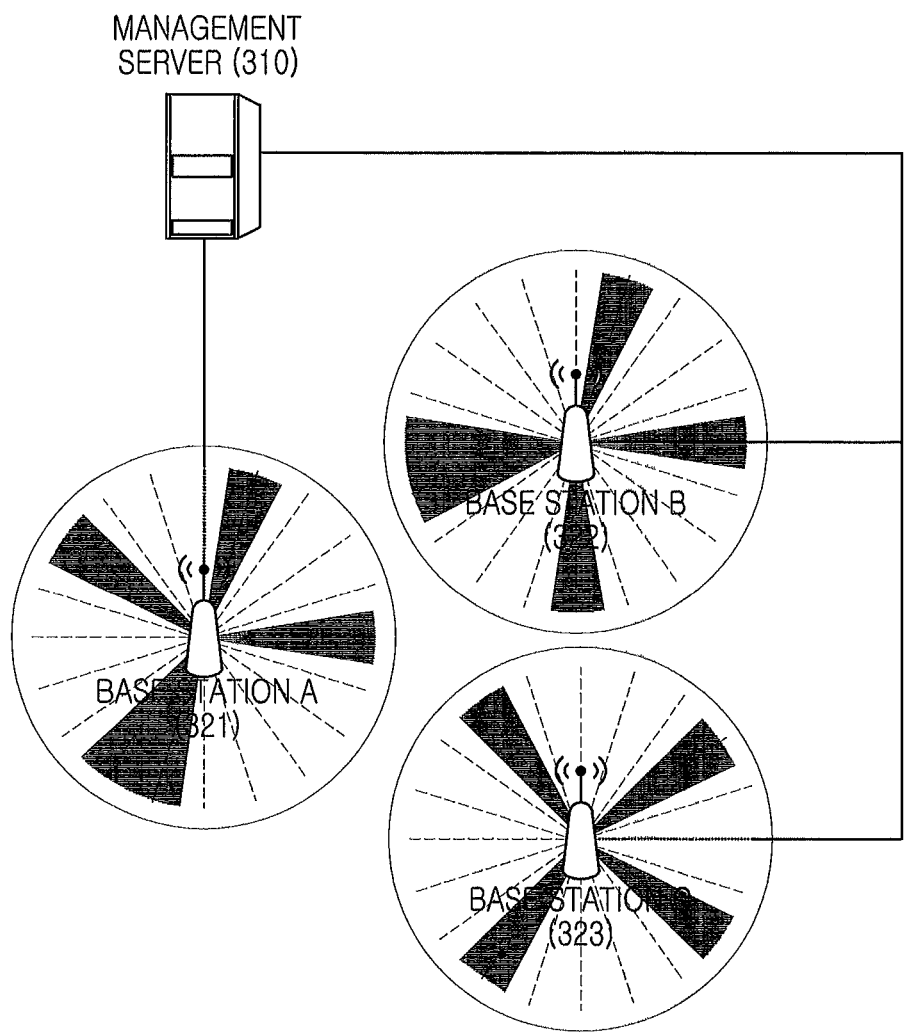
FIG. 3 illustrates a configuration example of a wireless communication system according to certain embodiments of the present disclosure.

FIG. 3 illustrates a configuration example of a wireless communication system according to certain embodiments of the present disclosure.

Referring to FIG. 3, the system includes a management server 310, a base station A 321, a base station B 322, and a base station C 323. There are three cells served by the respective base stations 321, 322, and 323. The management server 310 controls the beamforming and handover procedure of the base station A 321, the base station B 322, and the base station C 323. Although the management server 310 are illustrated as an entity independently of the base stations 321, 322, and 323 in FIG. 3, the management server 310 can be included in at least one of the base station A 321, the base station B 322, the base station C 323, and a different base station, or can be a part of an upper node of the base stations 321, 322, and 323. Each of the base stations 321, 322, and 323 provides a service to a terminal located within its own cell.

In this case, the base stations 321, 322, and 323 perform beamforming for efficient communication. Specifically, the base stations 321, 322, and 323 provide a service to respective terminals by using a beam directed in a selected direction among a plurality of candidate directions. In this case, it is possible to restrictively control a beam direction and a beam width according to the hardware performance of the base stations 321, 322 and 323 and service policies. The terminals are provided with a beam-based service by the base stations 321, 322 and 323 and can perform scanning with respect to beams of neighboring base stations based on indexes assigned according to the types of beams.

Figure 4:
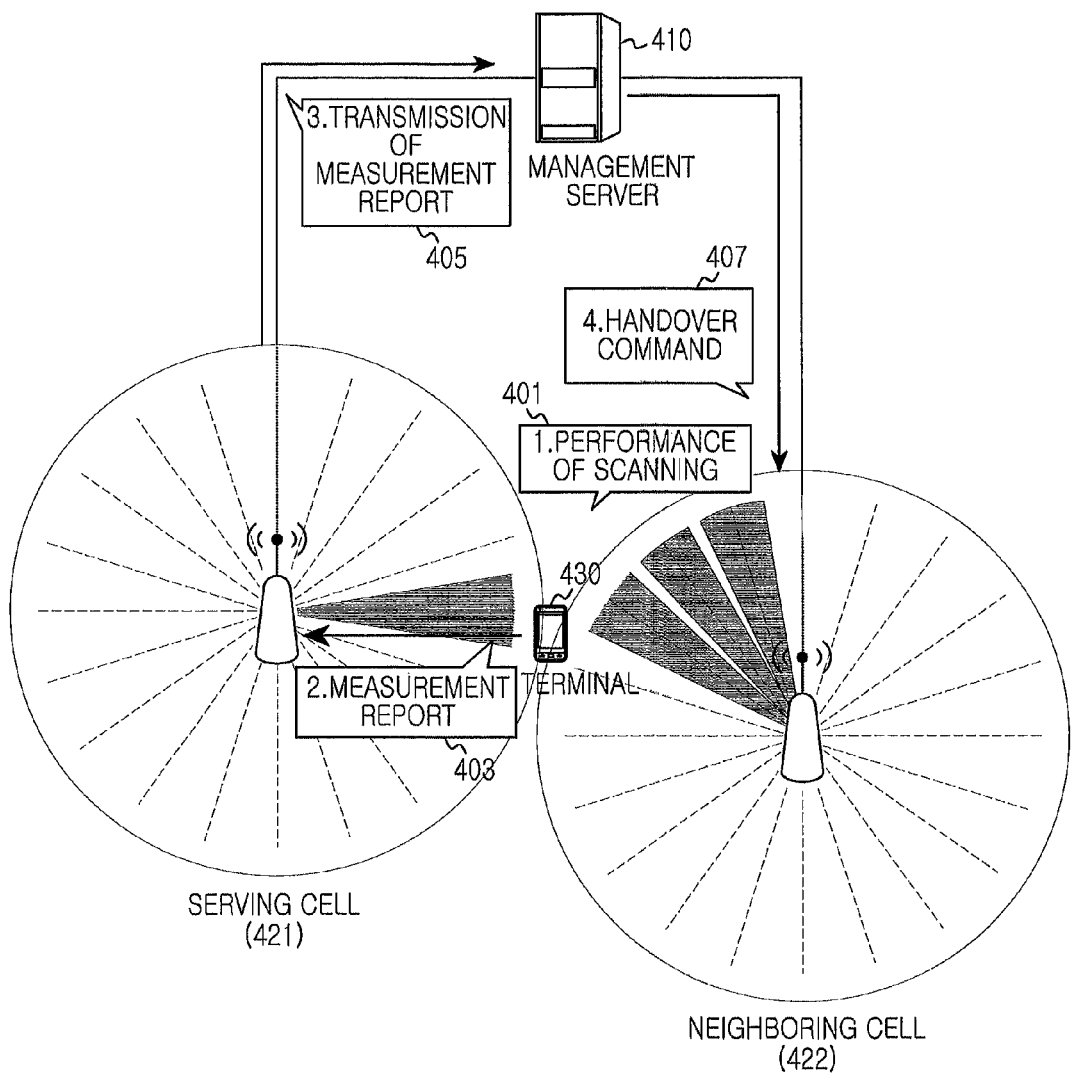
FIG. 4 illustrates a handover procedure in a wireless communication system according to certain embodiments of the present disclosure.

FIG. 4 schematically illustrates a handover procedure in a wireless communication system according to certain embodiments of the present disclosure.

Referring to FIG. 4, a terminal 430 is being provided with a service by a serving cell 421. In step 401, the terminal 430 performs scanning with respect to beams of neighboring base stations simultaneously when the terminal 430 is provided with the service by the serving cell 421. The scanning refers to a procedure of measuring a signal strength, a signal quality or the like with respect to a beamformed reference signal transmitted by a base station. The reference signal can be referred to as a preamble or a pilot. In the following description, the signal beamformed for scanning is referred to as a "scanning beam" for convenience of description.

Based on a result of scanning with respect to the beams of the neighboring base stations, the terminal 430 manages a list of neighboring beams of the neighboring base stations. Therefore, the list of neighboring beams in the terminal 430 includes information about a beam transmitted from a neighboring cell 422. When the received signal strength of a scanned beam is equal to or lower than a predetermined threshold value, the terminal 430 removes the beam from the list of neighboring beams. The terminal 430 can manage the list of neighboring beams of neighboring base stations according to a predetermined period.

If a received signal strength for a beam from the serving cell 421 is equal to or lower than the threshold value, the terminal 430 requests a handover to the beam of a neighboring base station in step 403. The request for handover can have the form of a measurement report. Accordingly, the base station of the serving cell 421 transmits the measurement report from the terminal 430 to the management server 410 in step 405.

The management server 410 that has received the measurement report determines the handover for the terminals 430, and transmits a handover command to the base station of the neighboring cell 422 in step 407. Accordingly, the terminal 430 identifies an optimal beam for the neighboring cell 422 in the list of beams, and performs a handover to the optimal beam. According to various embodiments of the present disclosure, the base stations provide beams having various widths as a scanning beam, thereby adaptively coping with various communication environments.

For the procedures as illustrated in FIG. 4, base stations according to embodiments of the present disclosure provide a scanning beam as described below. As illustrated in FIGS. 5 and 6, a base station can provide various types of scanning beams.

Figure 5A:
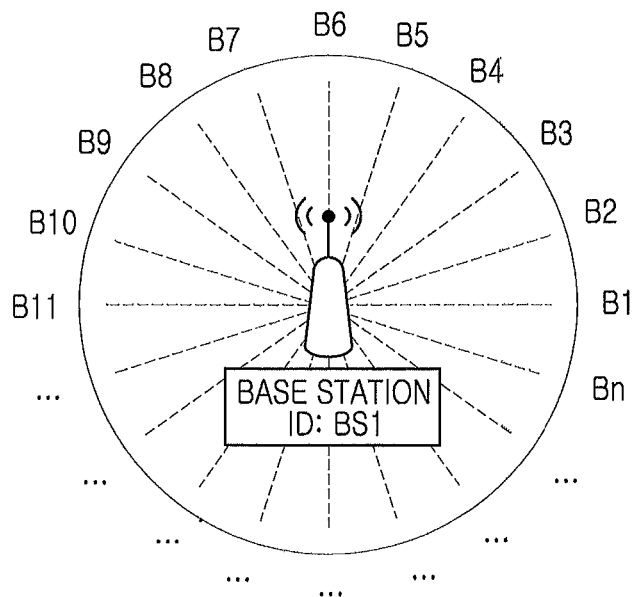
FIGS. 5A and 5B illustrate a scanning beam having a narrow beam width in a wireless communication system according to certain embodiments of the present disclosure.
Figure 5B:
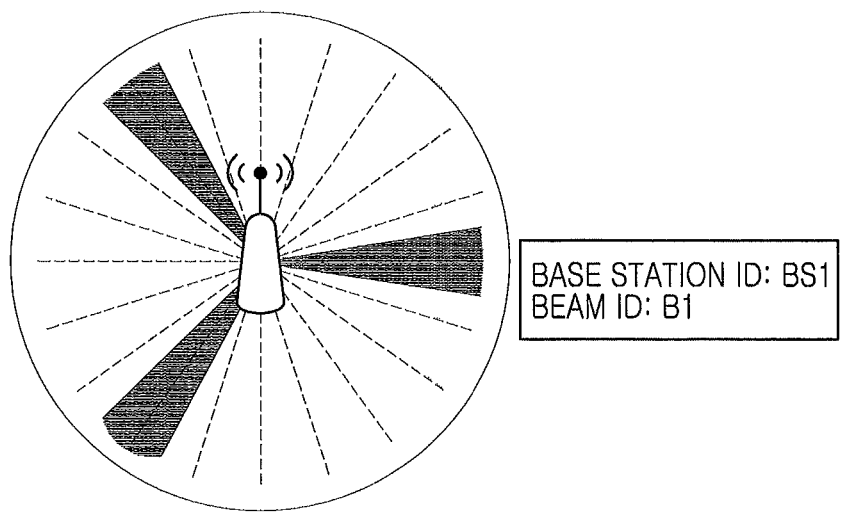

FIGS. 5A and 5B illustrate a scanning beam having a narrow beam width in a wireless communication system according to certain embodiments of the present disclosure. Referring to FIGS. 5A and 5B, a first type of scanning beam has a relatively narrow width and is assigned a beam identifier according to a direction. Since different identifiers are assigned according to beam directions, the terminal can perform scanning using the beam identifiers without information about beam directions. In certain embodiments of the present disclosure, the base station can provide information about beam directions, beam identifiers and the like to the terminal before performance of the scanning for celerity of the procedure. FIGS. 5A and 5B illustrate an example in which beam identifiers are assigned counterclockwise in the order of B1, B2 and B3. However, according to a specific embodiment, the beam identifiers can be assigned differently from the method illustrated in FIGS. 5A and 5B.

Figure 6A:
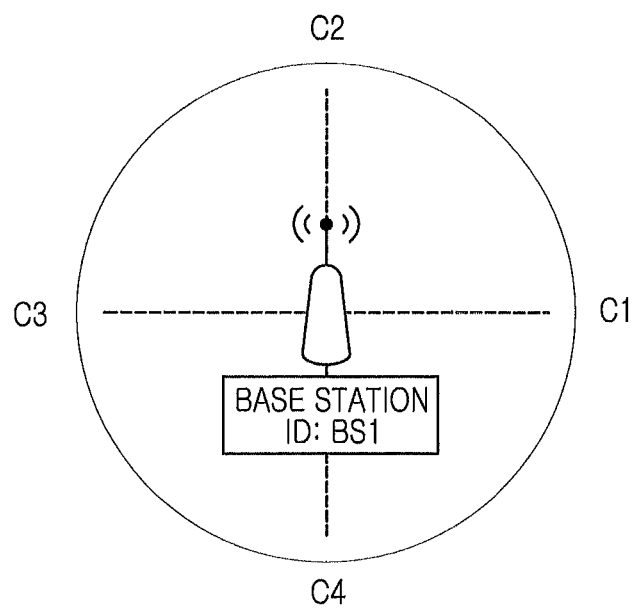
FIGS. 6A and 6B illustrate a scanning beam having a wide beam width in a wireless communication system according to certain embodiments of the present disclosure.
Figure 6B:
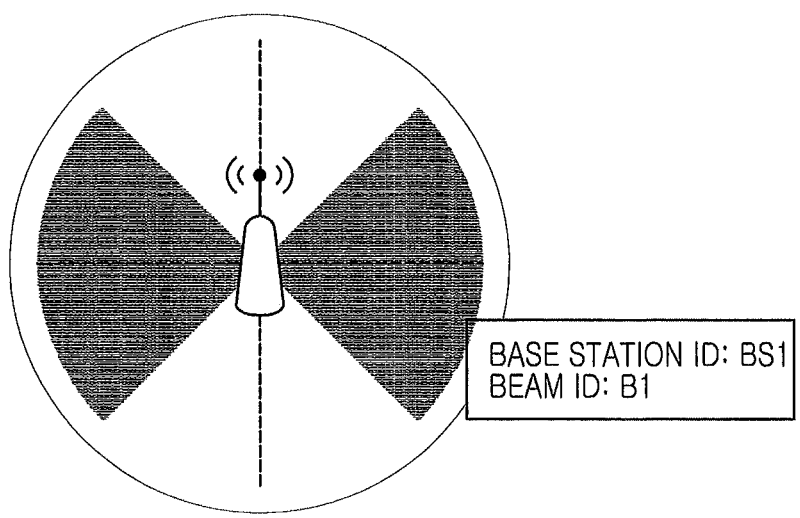
Figure 7A:
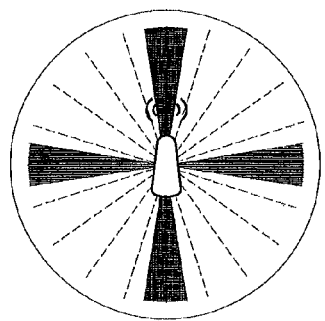
FIGS. 7A-7G illustrate examples of transmission patterns of scanning beams in a wireless communication system according to certain embodiments of the present disclosure.
Figure 7B:
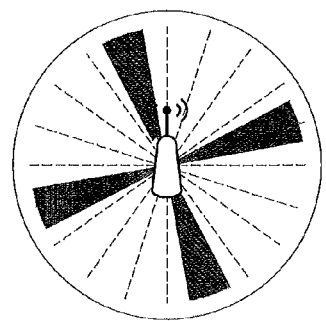
Figure 7C:
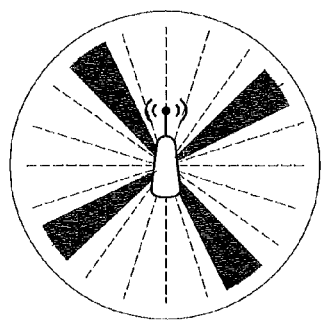
Figure 7D:
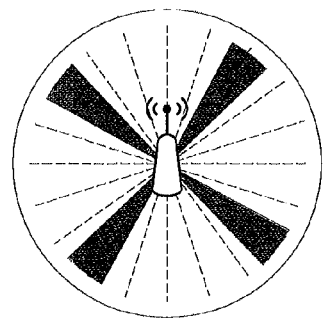
Figure 7E:
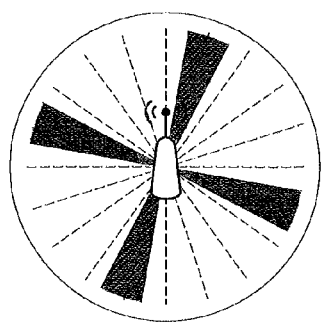
Figure 7F:
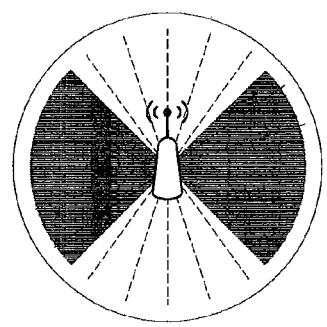
Figure 7G:
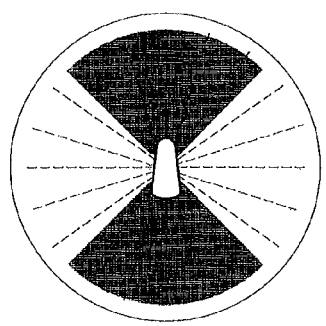

FIGS. 6A and 6B illustrate a scanning beam having a wide beam width in a wireless communication system according to certain embodiments of the present disclosure. Referring to FIGS. 6A and 6B, a second type of scanning beam has a width relatively wider than the first type of scanning beam illustrated in FIGS. 5A and 5B. Since the second type of scanning beam has a different width from the first type of scanning beam, the second type of scanning beam is assigned a different beam identifier even though the direction of the second type of scanning beam is identical to that of the first type of scanning beam. FIGS. 6A and 6B illustrate an example in which beam identifiers are assigned counterclockwise in the order of C1, C2 and C3. However, according to a specific embodiment, the beam identifiers can be assigned differently from the method illustrated in FIGS. 6A and 6B.

Each of the scanning beams illustrated in FIGS. 5A and 5B and FIGS. 6A and 6B can be a means for providing the base station identifier of a base station which each beam belongs to and its own beam identifier. For example, the scanning beams can be configured by a sequence representing the base station identifier and the beam identifier. As another example, the base station identifier and the beam identifier can be expressed through the location of a sub-carrier to which the signal of the scanning beam is mapped. As still another example, in order to express the base station identifier and the beam identifier, the sequence and the location of the sub-carrier can be used in a complex manner.

Although only two types of scanning beams are illustrated, many more types of beam identifiers can be assigned according to the number of available beam widths. Through a beam identifier provision method having a hierarchy structure as described above, the base station according to certain embodiments of the present disclosure can adaptively provide the scanning beam to the terminal even in a non line-of-sight (NLOS) environment. The present disclosure supports the terminal's mobility by providing a scanning method using beam identifiers as described above, thereby facilitating beam scanning even in an environment where there are many users. In addition, a sector beam is not used, thereby simplifying a handover procedure.

FIGS. 7A-7G illustrate examples of a transmission pattern of scanning beams in a wireless communication system according to certain embodiments of the present disclosure. Since beams are used to improve re-use of the coverage of a base station, a plurality of scanning beams can be transmitted simultaneously within a range the base station supports. A specific design for transmission of scanning beams can be determined in consideration of the arrangement of neighboring base stations in an actual network configuration. FIGS. 7A-7G illustrate examples in which four of a first type of scanning beam are simultaneously broadcasted and two of a second type of scanning beam are simultaneously broadcasted. As illustrated in FIGS. 7A-7G, the base station transmits four of a first type of scanning beam five times to transmit the first type of scanning beam in all directions, and transmits two second type of scanning beam two times to transmit the second type of scanning beams in all directions.

FIG. 8 illustrates an example of a list for management of scanning results in a wireless communication system according to certain embodiments of the present disclosure. FIG. 8 illustrates an example of a structure for storing scanning results through scanning beams.

In a scanning procedure, when the strength of the received signal of a scanning beam from a neighboring base station is equal to or greater than a predetermined threshold value, a terminal stores the base station identifier of the neighboring base station which transmits the scanning beam and the beam identifier of the scanning beam. In this case, as illustrated in FIG. 8, the base station identifier is written to a list 810 of neighboring base station IDs and the beam identifier is written to a list 820 of neighboring beam IDs. The base station identifier and the beam identifier can be written as a pair. In addition, in the scanning procedure, when the strength of the received signal of a scanning beam from a serving base station is equal to or greater than a predetermined threshold value, the terminal stores the beam identifier of the scanning beam. As illustrated in FIG. 8, the beam identifier can be written to a list 830 of active beam IDs. An operation using tables illustrated in FIG. 8 will be described below.

Figure 9:
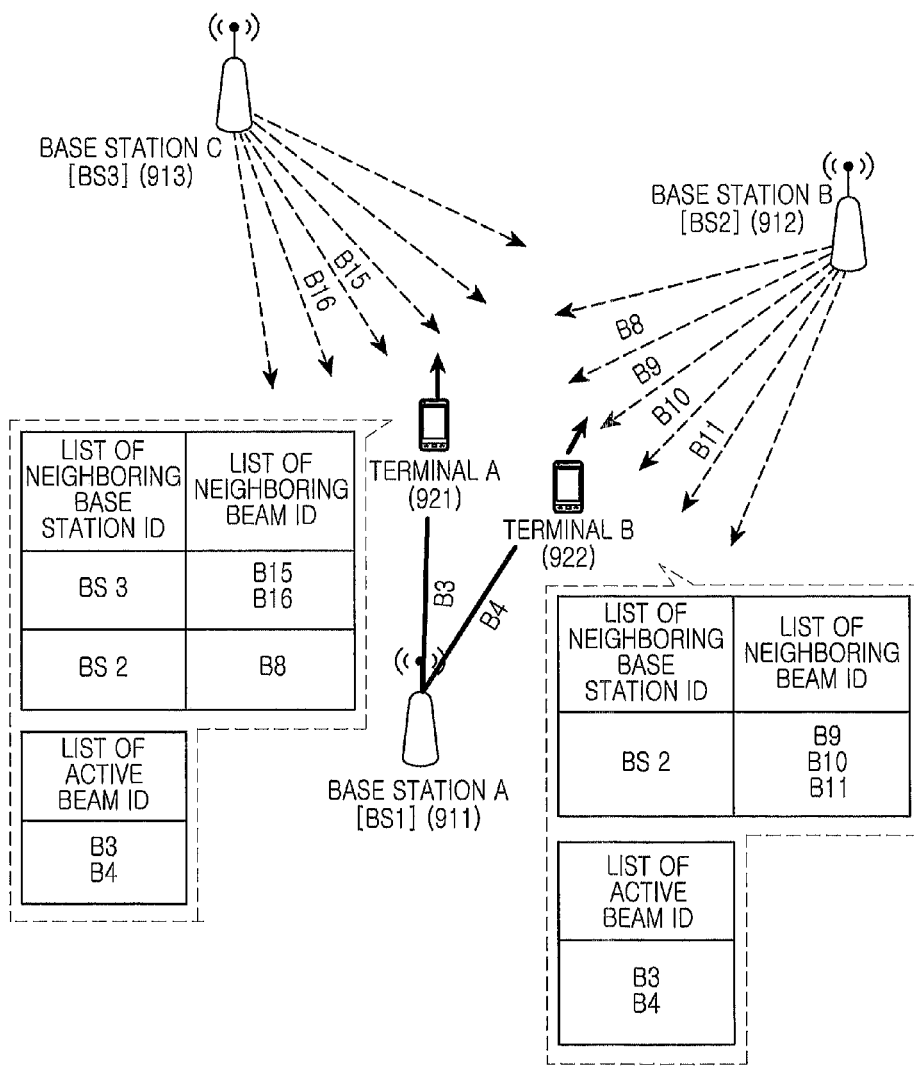
FIG. 9 illustrates an example of management of scanning results in a wireless communication system according to certain embodiments of the present disclosure.

FIG. 9 illustrates an example of management of scanning results in a wireless communication system according to certain embodiments of the present disclosure. Referring to FIG. 9, a base station A 911 is a serving base station for a terminal A 921 and a terminal B 922, and a base station B 912 and a base station C 913 are the neighboring base stations of the terminal A 921 and the terminal B 922. The scanning results of the terminal A 921 and the terminal B 922 with respect to the base station A 911, the base station B 912 and the base station C 913 are also illustrated schematically in FIG. 9.

The scanning beams B3 and B4 of the base station A 911, the scanning beam B8 of the base station B 912, and the scanning beams B15 and B16 of the base station C 913 are received with a signal strength equal to or greater than a threshold value by the terminal A 921. Accordingly, as illustrated in FIG. 9, in connection with the terminal A 921, a list of neighboring base station IDs includes BS3 and BS2, a list of neighboring beam IDs includes B15 and B16 corresponding to BS3 and B8 corresponding to BS2. A list of active beam IDs includes B3 and B4. In addition, as illustrated in FIG. 9, in connection with the terminal B 922, a list of neighboring base station IDs includes BS2, a list of neighboring beam IDs includes B9, B10, and B11 corresponding to BS2, and a list of active beam IDs includes B3 and B4.

According to certain embodiments of the present disclosure, the terminal performs a handover based on a result of beam scanning. Since a general handover without consideration of beams is a handover between base stations, the increasing and decreasing width of a received signal due to travel of the terminal are generally uniform. Therefore, a terminal located in a cell border area can acquire a relatively long time to select an optimal target base station for handover.

However, in the system according to certain embodiments of the present disclosure, a plurality of beams need to be considered since a handover to a beam is performed within a base station unlike a handover to a base station. Accordingly, a point in time when a handover is possible is variable according to the travel direction of a terminal, and the increasing and decreasing width of a signal strength is also non-uniform. In addition, when there are a plurality of scanning beams that satisfy a handover condition within one neighboring base station, the terminal can perform a handover selectively. In addition, a situation in which a handover of a serving beam to another beam within an identical base station can occur. In this case, since the travel of a terminal is within one base station, it is possible to manage the mobility of the terminal according to scheduling rather than handover.

Figure 10:
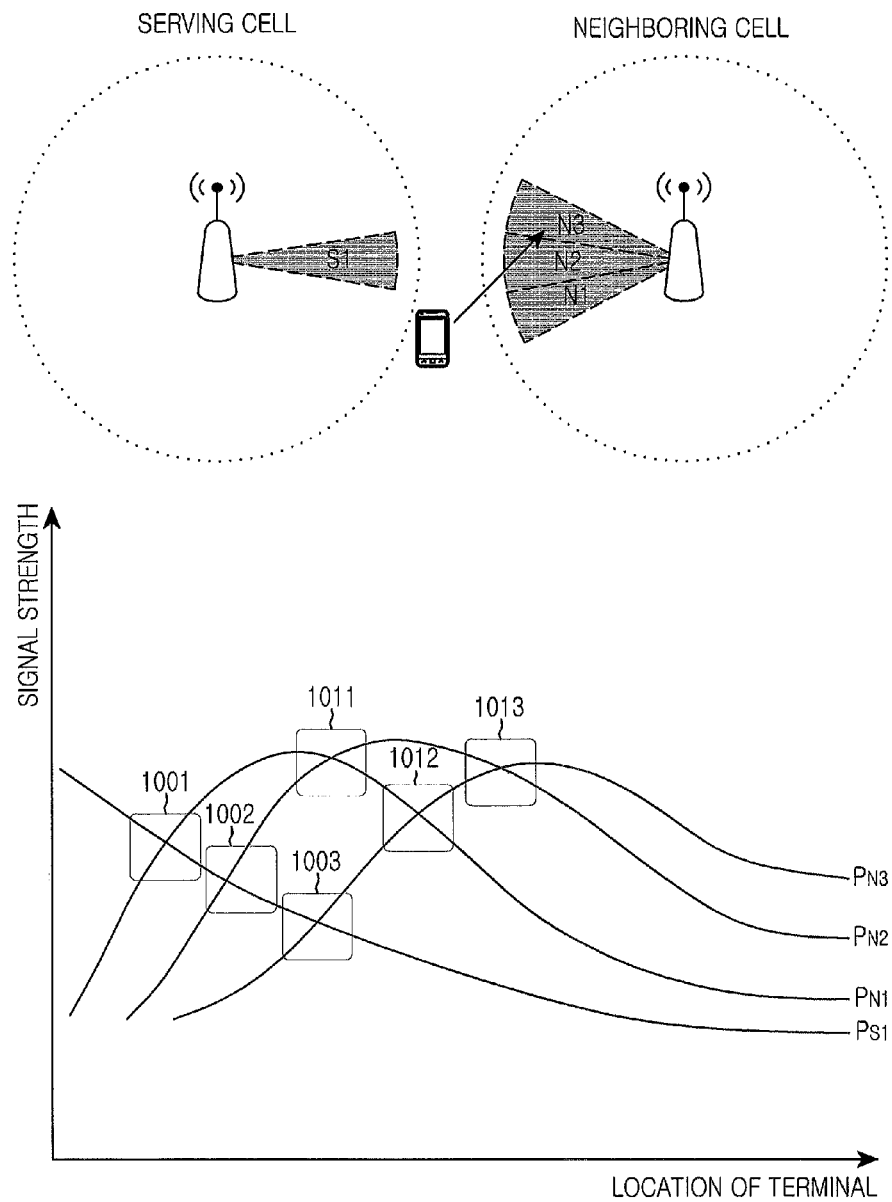
FIG. 10 illustrates examples of time points at which a handover is possible in a wireless communication system according to certain embodiments of the present disclosure.

FIG. 10 schematically illustrates examples of points in time when a handover is possible in a wireless communication system according to certain embodiments of the present disclosure. Referring to FIG. 10, a terminal is provided with a service using a beam S1 in a serving cell. In this case, the terminal travels toward a neighboring cell, and sequentially approaches the beams N1, N2, and N3 of the neighboring cell. In this case, referring to a graph in FIG. 10, a signal strength PS1 for the beam S1 decreases gradually, and a signal strength PN1 for the beam N1, a signal strength PN2 for the beam N2, and a signal strength PN3 for the beam N3 increase gradually. In this case, there are a plurality of points at which the signal strength ranking of the beams is changed. Among the points, a handover is required at points 1001, 1002, and 1003 at which the signal strength ranking of the beams of different base stations is changed. On the other hands, the points 1011, 1012, and 1013 at which the signal strength ranking of the beams of different base stations is changed are points at which change of a serving beam is required through scheduling.

In the case of determining a time point at which a handover is performed, in order to prevent a ping-pong phenomenon, it is general to perform the handover when the difference between signal strengths is equal to or greater than a predetermined threshold value. In the present disclosure, since an inter-beam handover is performed, the ping-pong phenomenon related with the neighboring beam of a serving cell, that is, an active beam as well as the ping-pong phenomenon related with the serving beam of the serving cell need to be considered. In this case, the active beam is a beam having a received signal strength equal to or greater than a predetermined threshold value besides the serving beam among the beams of the serving base stations. Accordingly, a matrix for selection of the beam of a neighboring base station, on which a handover is performed, can be defined as Equation (1):

$$\max_{C_i} E\{P_{C_i}\} \quad (1)$$
$$\text{s.t.} \quad P_{C_i} - \alpha_{C_i} > P_{B_S}$$
$$P_{C_i} - \alpha_{C_i} > P_{B_a}$$
$$P_{C_i} > \Delta,$$

where $E\{\ \}$ denotes an average operator, Ci denotes the beam identifier of a neighboring base station, $P_{C_i}$ denotes a received signal strength for beam Ci, Bi denotes the beam identifier of a serving base station, $P_{BS}$ denotes a received signal strength for the active beam of the serving base station, $\alpha_{C_i}$ denotes a required difference value for preventing a ping-pong phenomenon, $\Delta$ denotes a minimum value of a received signal strength that allows for a handover.

Referring to Equation (1), the beam of a neighboring base station, on which a handover is performed, needs to have a received signal strength equal to or greater than $\Delta$, and the beam of the neighboring base station needs to have a received signal strength greater than that of a serving beam and an active beam by at least $\alpha_{C_i}$.

Since the plurality of beams of a neighboring base station are considered according to the present disclosure, a beam that satisfies a matrix, such as Equation (1), can be changed within a short time. Therefore, the terminal or the management server according to certain embodiments of the present disclosure can determine a handover when a state in which the matrix, such as Equation (1), is satisfied is maintained for more than a predetermined time. Since beam change within a same base station is processed through scheduling in certain embodiments of the present disclosure, the terminal or the management base station can determine a handover at a time point that initially satisfies the matrix such as Equation (1).

Figure 11:
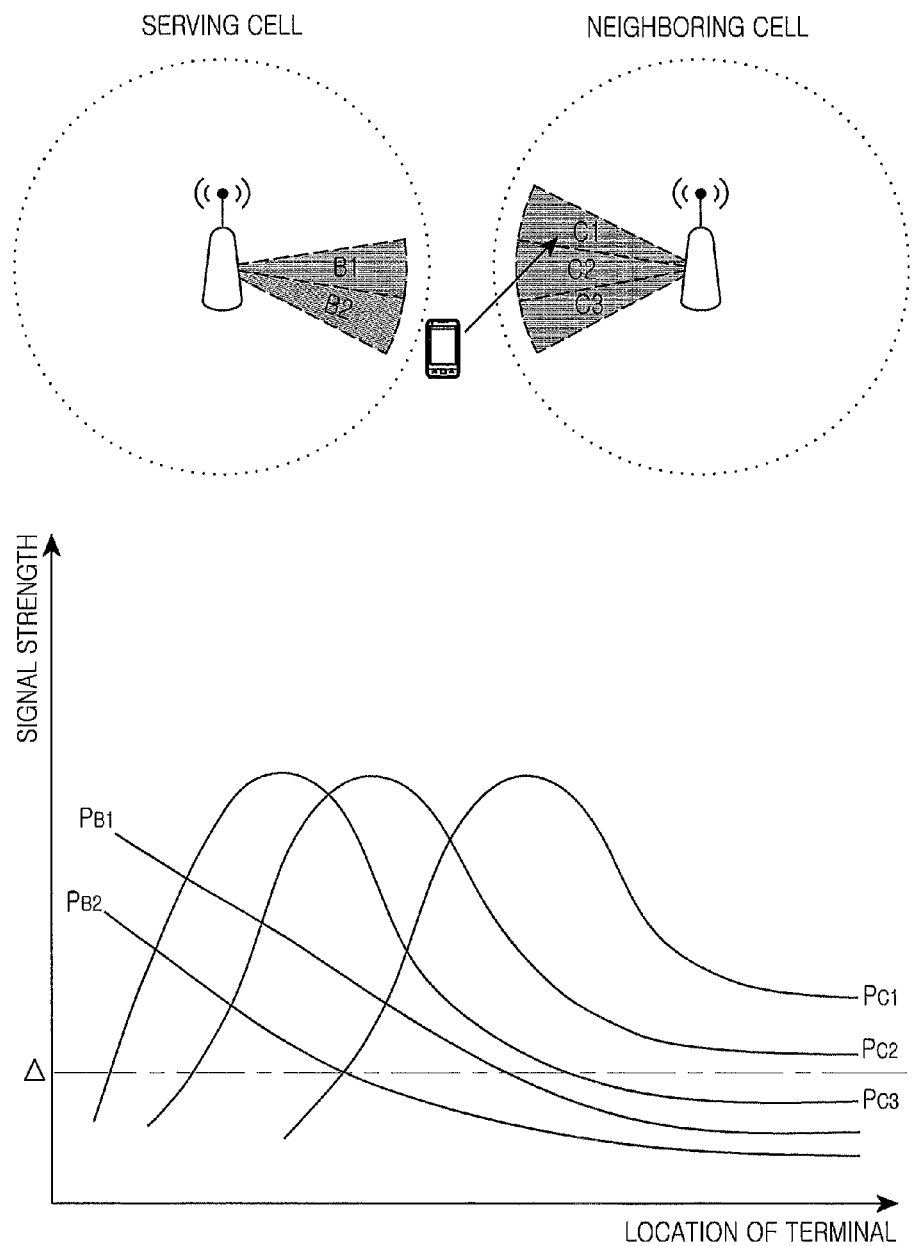
FIG. 11 illustrates examples of time points at which a handover matrix is satisfied, which are determined by only a narrow beam in a wireless communication system according to certain embodiments of the present disclosure.

FIG. 11 illustrates examples of time points at which a handover matrix is satisfied, which are determined by only a narrow beam in a wireless communication system according to certain embodiments of the present disclosure. FIG. 11 illustrates the travel path of a terminal traveling in a direction from a serving cell to a neighboring cell and change in a signal strength due to the traveling. In FIG. 11, a terminal receives B1 as a serving beam and B2 as an active beam in a serving cell, and three narrow beams C1, C2, and C3 as candidate beams from a neighboring cell. As illustrated in FIG. 11, as the terminal travels, time points at which the C3, C2, and C1 satisfy the matrix of Equation (1) respectively are reached sequentially. In this case, the target beam of handover is determined according to how to define a predetermined time for which a state satisfying the matrix is to be maintained.

Figure 12:
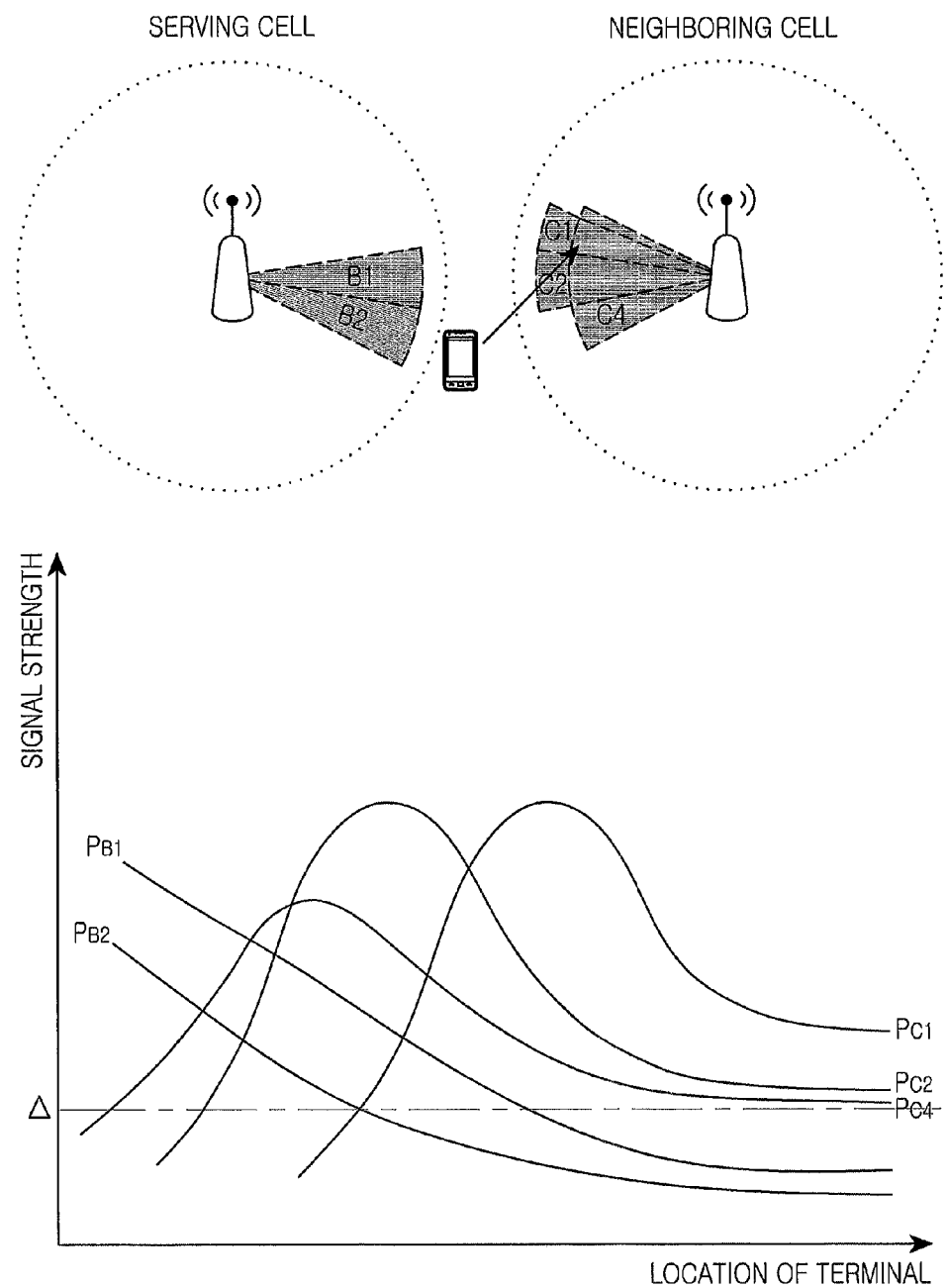
FIG. 12 illustrates examples of time points at which a handover matrix is satisfied, which are determined by a narrow beam and a wide beam in a wireless communication system according to certain embodiments of the present disclosure.

FIG. 12 illustrates examples of time points at which a handover matrix is satisfied, which are determined by a narrow beam and a wide beam in a wireless communication system according to certain embodiments of the present disclosure. FIG. 11 illustrates the travel path of a terminal traveling in a direction from a serving cell to a neighboring cell and change in a signal strength due to the traveling. In FIG. 11, a terminal receives B1 as a serving beam and B2 as an active beam in a serving cell, and two narrow beams C1 and C2, and one wide beam C4 as candidate beams from a neighboring cell. That is, FIG. 12 assumes an environment in which the beam C3 of the neighboring cell is hardly received due to NLOS. As illustrated in FIG. 12, as the terminal travels, time points at which the C4, C2, and C1 satisfy matrix of Equation (1) respectively are reached sequentially. In this case, the target beam of a handover is determined according to how to define a predetermined time for which a situation satisfying the matrix is to be maintained.

Figure 13:
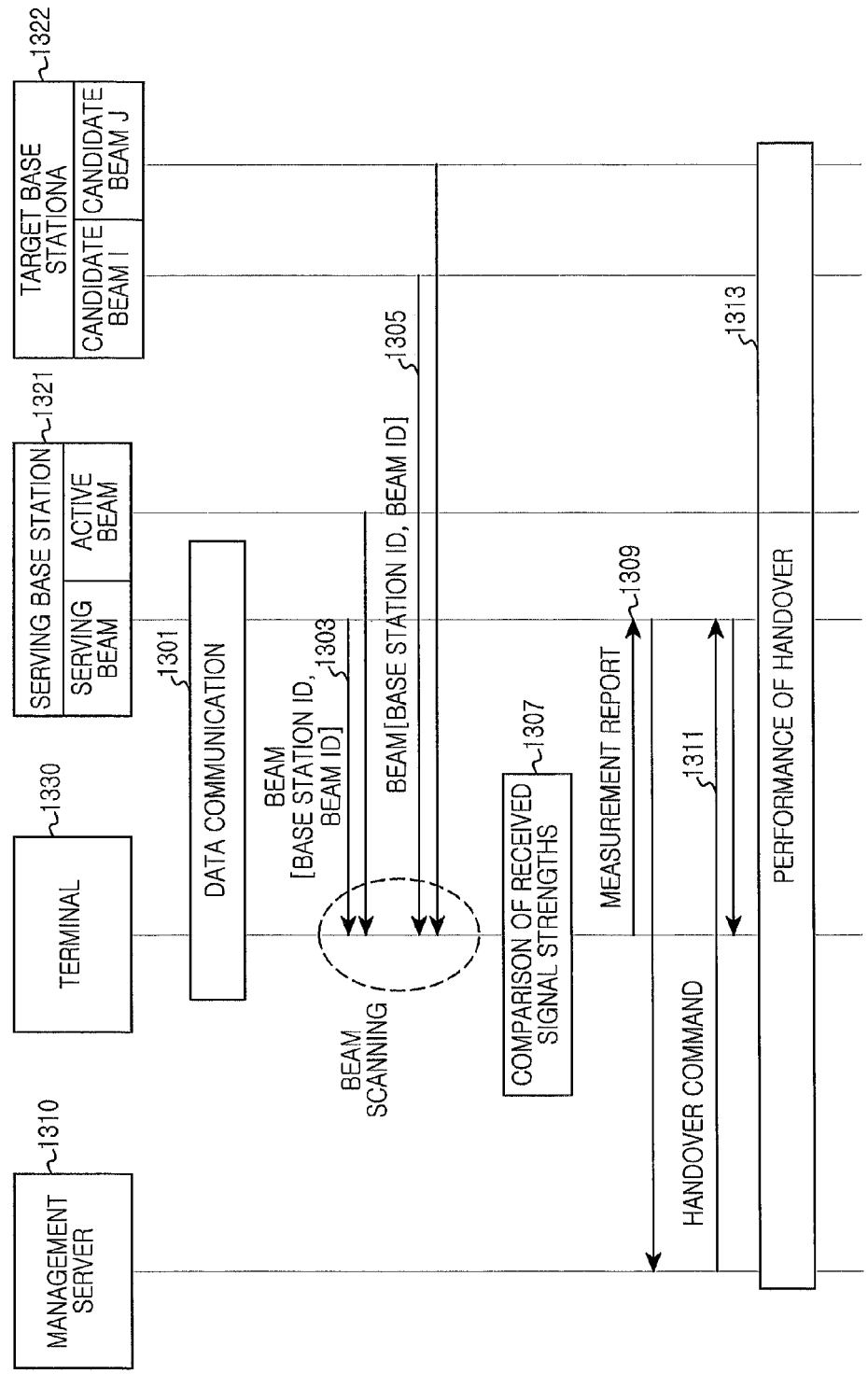
FIG. 13 illustrates signal exchange for a handover in a wireless communication system according to certain embodiments of the present disclosure.

FIG. 13 illustrates signal exchange for a handover in a wireless communication system according to certain embodiments of the present disclosure.

Referring to FIG. 13, in step 1301, a terminal 1330 performs data communication with a serving base station 1321. That is, the terminal 1330 is located within the coverage of the serving base station 1321, and performs communication using one of a plurality of beams supported by the serving base station 1321 as a serving beam.

In step 1303, the terminal 1330 receives the scanning beams of the serving base station 1321. In step 1305, the terminal 1330 receives the scanning beams of a target base station 1322. In this case, a beam used for communication among the scanning beams of the serving base station 1321 is called a serving beam, and a beam received with a received signal strength equal to or greater than a predetermined threshold value other than the serving beam is called an active beam. The scanning beams of the target base station 1322 are called candidate beams. In steps 1303 and 1305, the terminal 1330 performs beam scanning with respect to the serving base station 1321 and the target base station 1322. In this case, each of the scanning beams provides a base station identifier and a beam identifier. Although not illustrated in FIG. 13, the scanning can be performed according to a predefined period.

In step 1307, the terminal 1330 compares received signal strengths with respect to the serving beam, the active beam and the candidate beams. Thereafter, in step 1309, the terminal 1330 transmits a measurement report including a result of comparison of the received signal strengths to a management server 1310 through the serving base station 1321. In this case, information items included in the measurement report can be changed according to a specific embodiment. For example, the measurement report can include the received signal strengths with respect to the serving beam, the active beam, and the candidate beams. As another example, the measurement report can include a result of comparison between the received signal strengths with respect to the serving beam, the active beam, and the candidate beams. As still another example, the measurement report can include a result of determination of whether to perform a handover based on the result of comparison between the received signal strengths. In this case, the terminal 1330 determines whether there is a candidate beam satisfying a handover matrix using results of scanning performed with respect to the serving base station 1321 and the target base station 1322.

In step 1311, the management server 1320 transmits a handover command to the terminal 1330 through the serving base station 1321. In this case, whether to perform a handover is determined by the terminal 1330, and the handover command functions as a confirm message. Accordingly, in step 1313, the terminal 1330 performs a handover from the serving base station 1321 to the target base station 1322.

Although not illustrated in FIG. 13, the terminal 1330 can be provided with information necessary for beam scanning by the serving base station 1321. For example, the information necessary for beam scanning can include at least one of a point in time for beam scanning (for example, period and frame number), a location of resources in which the scanning beam is transmitted, the number of the types of scanning beams, the number of beams, and a list of scanning beam identifiers. The information necessary for beam scanning can be provided at an initial entrance or through periodic signaling.

The operations and configurations of a terminal, a base station, and a management server which perform a handover as described above will be described below in detail.

Figure 14:
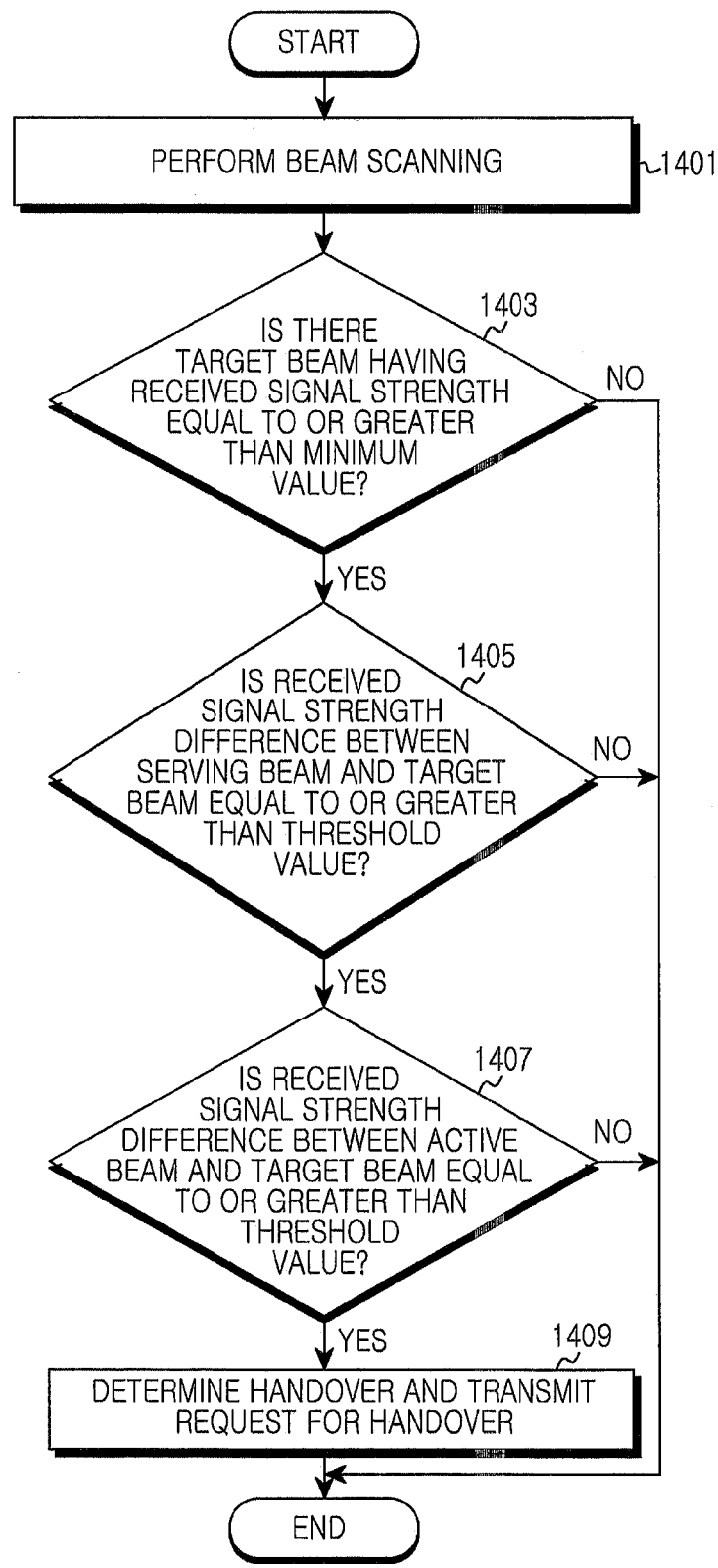
FIG. 14 illustrates an operation process of a terminal in a wireless communication system according to certain embodiments of the present disclosure.

FIG. 14 illustrates an operation process of a terminal in a wireless communication system according to certain embodiments of the present disclosure.

Referring to FIG. 14, in step 1401, the terminal performs beam scanning. In other words, the terminal measures received signal strengths for the scanning beams of a serving base station and at least one neighboring base station. In this case, the scanning beams are repeatedly transmitted in a plurality of directions and can be classified into a plurality of types having different beam widths. In this case, for beam scanning, the terminal can perform a correlation operation between the previously known sequence of the scanning beam and a received signal, or perform detection without the correlation operation. Although not illustrated in FIG. 14, the terminal can acquire information necessary for the beam scanning before performing the beam scanning.

In step 1403, the terminal determines whether there is a target beam of which the received signal strength is equal to or greater than a minimum value among the scanning beams of at least one neighboring base station. The minimum value is a lower limit value of a received signal strength required to be considered as the target for a handover. The minimum value can be determined in consideration of a channel quality, a signal strength or the like necessary to ensure a minimum transmission rate. In this case, there can be a plurality of target beams of which the received signal strength is equal to or greater than the minimum value. In this case, a process as described below is performed with respect to a target beam having a maximum received signal strength.

When there is the target beam, the terminal determines whether the received signal strength difference between the serving beam and the target beam is equal to or greater than a threshold value in step 1405. The threshold value associated with the received signal strength difference is for preventing a ping-pong phenomenon. That is, in order to prevent a phenomenon in which a handover to the target beam is performed and a handover to the serving beam is performed again, the terminal compares the received signal strength difference between the serving beam and the target beam with the threshold value.

When the received signal strength difference between the serving beam and the target beam is equal to or greater than the threshold value, the terminal determines whether the received signal strength difference between the active beam and the target beam is equal to or greater than the threshold value in step 1407. Since an inter-beam handover is considered according to the present disclosure, the ping-pong phenomenon associated with another beam other than the serving beam is also required to be considered. That is, to prevent a phenomenon in which a handover to the target beam is performed and a handover to the serving base station due to the active beam is performed again, the terminal compares the received signal strength difference between the active beam and the target beam with the threshold value. In this case, when there are a plurality of active beams, step 1407 is performed respectively for respective active beams. In this case, whether the threshold value for the serving beam used in step 1405 and the threshold value for the serving beam used in step 1405 are identical to each other is determined according to a specific embodiment. That is, the two threshold values can be equal to or different from each other.

When the received signal strength difference between the active beam and the target beam is equal to or greater than the threshold value, the terminal determines a handover to the target beam and transmits a request for handover to a node for performing control for handover in step 1409. For example, the node can be a base station or a separate management server. Thereafter, the terminal performs the handover procedure.

In summary, the terminal performs a handover to a target beam satisfying a condition such as Equation (1), and when there are a plurality of target beams, performs a handover to the target beam having a greatest received signal strength.

The operation process of the terminal illustrated in FIG. 14 is for an embodiment in which a terminal determines whether to perform a handover. In certain embodiments of the present disclosure, whether to perform the handover can be determined by a base station or a separate management server, not the terminal. In this case, after performing beam scanning, the terminal reports the results of beam scanning to the base station or the management server. In this case, reported information can include at least one of received signal strengths with respect to scanning beams or a result of comparison between the received signal strengths.

The method described above in relation with FIG. 14 under of the present invention may be provided as one or more instructions in one or more software modules, or computer programs stored in the terminal.

Figure 15:
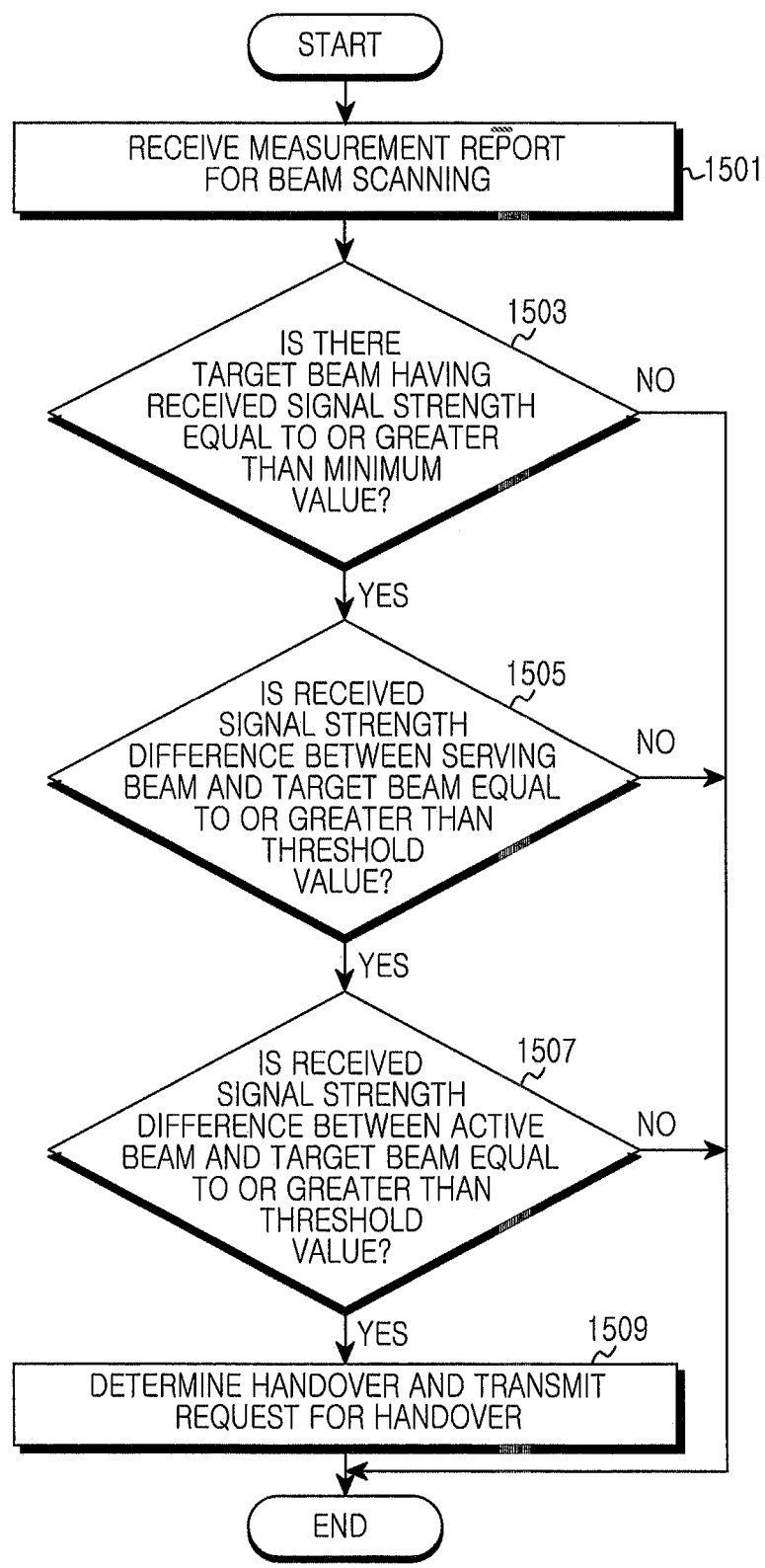
FIG. 15 illustrates an operation process of a handover determiner in a wireless communication system according to certain embodiments of the present disclosure.

FIG. 15 illustrates an operation process of a handover determiner in a wireless communication system according to certain embodiments of the present disclosure. In FIG. 15, the handover determiner refers to a node for determining the handover of a terminal, and can be one of a base station and a separate management server.

Referring to FIG. 15, in step 1501, the handover determiner receives a measurement report with respect to beam scanning performed by the terminal. The measurement report can include at least one of received signal strengths with respect to scanning beams or a result of comparison between the received signal strengths.

In step 1503, the handover determiner determines whether there is a target beam of which the received signal strength is equal to or greater than a minimum value among the scanning beams of at least one neighboring base station. The minimum value is a lower limit value of a received signal strength required to be considered as an object for a handover. The minimum value can be determined in consideration of a channel quality, a signal strength or the like necessary to ensure a minimum transmission rate. In this case, there can be a plurality of target beams of which the received signal strength is equal to or greater than the minimum value. In this case, a process as described below is performed with respect to a target beam having a maximum received signal strength.

When there is the target beam, the handover determiner determines whether the received signal strength difference between the serving beam and the target beam is equal to or greater than a threshold value in step 1505. The threshold value associated with the received signal strength difference is for preventing a ping-pong phenomenon. That is, in order to prevent a phenomenon in which a handover to the target beam is performed and a handover to the serving beam is performed again, the handover determiner compares the received signal strength difference between the serving beam and the target beam with the threshold value.

When the received signal strength difference between the serving beam and the target beam is equal to or greater than the threshold value, the handover determiner determines whether the received signal strength difference between the active beam and the target beam is equal to or greater than the threshold value in step 1507. Since an inter-beam handover is considered according to the present disclosure, the ping-pong phenomenon associated with another beam other than the serving beam is also required to be considered. That is, in order to prevent a phenomenon in which a handover to the target beam is performed and a handover to the serving base station due to the active beam is performed again, the handover determiner compares the received signal strength difference between the active beam and the target beam with the threshold value. In this case, when there are a plurality of active beams, step 1507 is performed respectively for respective active beams. In this case, whether the threshold value for the serving beam used in step 1505 and the threshold value for the serving beam used in step 1507 are identical to each other is determined according to a specific embodiment. That is, the two threshold values can be equal to or different from each other.

When the received signal strength difference between the active beam and the target beam is equal to or greater than the threshold value, the handover determiner determines a handover to the target beam and transmits a request for handover to a node for performing control for handover in step 1509.

In summary, the base station commands the handover to a target beam satisfying a condition such as Equation (1), and when there are a plurality of target beams, commands a handover to the target beam having a greatest received signal strength.

The method described above in relation with FIG. 15 under of the present invention may be provided as one or more instructions in one or more software modules, or computer programs stored in the handover determiner.

Figure 16:
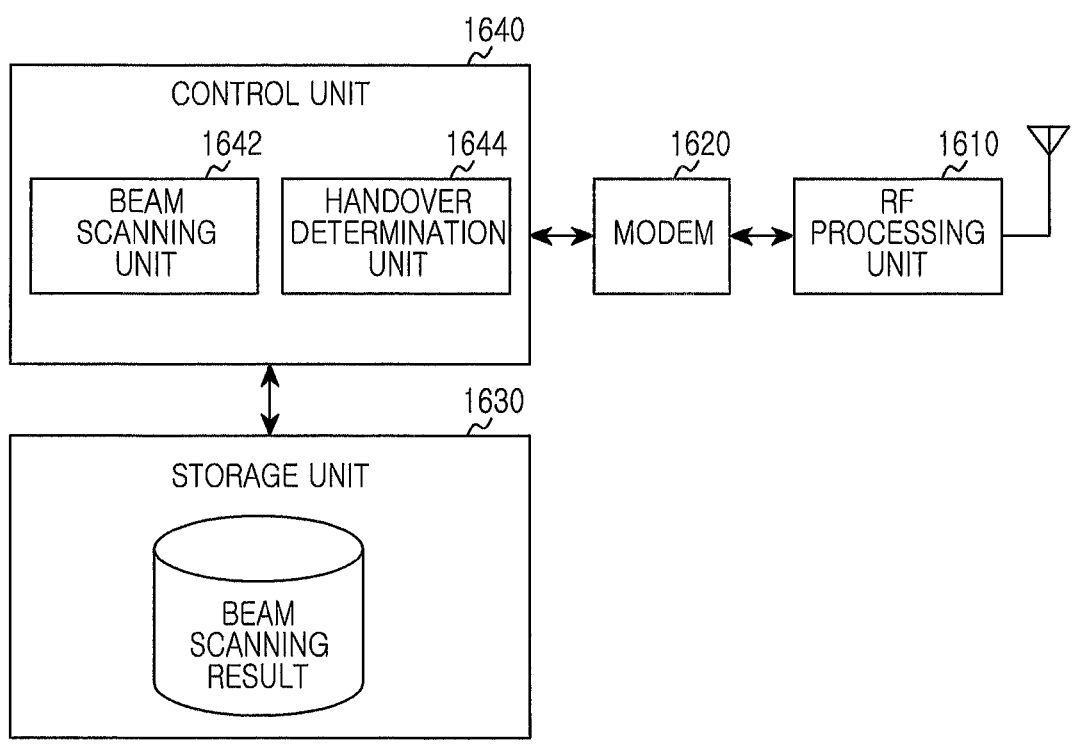
FIG. 16 illustrates a block configuration of a terminal in a wireless communication system according to certain embodiments of the present disclosure.

FIG. 16 illustrates a block configuration of a terminal in a wireless communication system according to certain embodiments of the present disclosure.

Referring to FIG. 16, the terminal includes an RF processing unit 1610, a modem 1620, a storage unit 1630, and a control unit 1640.

The RF processing unit 1610 performs functions for transmitting/receiving signals through radio channels, such as signal band conversion and amplification. That is, the RF processing unit 1610 up-converts a baseband signal received from the modem 1620 into an RF signal and transmits the RF signal through an antenna and down-converts an RF signal received through the antenna into a baseband signal. For example, the RF processing unit 1610 can include an amplifier, a mixer, an oscillator, a digital-to-analog converter (DAC), an analog-to-digital converter (ADC), and the like. Although only one antenna is illustrated in FIG. 16, the terminal can include a plurality of antennas.

The modem 720 performs conversion between a baseband signal and a bitstream according to a physical layer standard of the system. For example, according to an OFDM (Orthogonal Frequency Division Multiplexing) scheme, in a data transmission mode, the modem 1620 generates complex symbols by encoding/modulating a TX bitstream, maps the complex symbols to subcarriers, and generates OFDM symbols by Inverse Fast Fourier Transform (IFFT) operation and Cyclic Prefix (CP) insertion. Also, in a data reception mode, the modem 1620 divides a baseband signal received from the RF processing unit 1610 into OFDM symbols, restores signals mapped to subcarriers by Fast Fourier Transform (FFT) operation, and restores a received bitstream by demodulation and decoding.

The storage unit 1630 stores data, such as basic programs, application programs and setting information for the operation of the terminal. In particular, the storage unit 1630 stores a result of beam scanning. For example, the result of beam scanning can be stored in the form of list as in FIG. 8. In addition, the storage unit 1630 provides stored data according to a request from the control unit 1640.

The control unit 1640 controls an overall operation of the terminal. For example, the control unit 1640 transmits and receives signals through the modem 1620 and the RF processing unit 1610. In addition, the control unit 1640 writes data to the storage unit 1630 and reads data in the storage unit 1630. In particular, the control unit 1640 includes a beam scanning unit 1642 for performing beam scanning with respect to a serving base station and a neighboring base station and a handover determination unit 1644 for determining whether to perform an inter-beam handover according to a result of the beam scanning. For example, the control unit 1640 enables the terminal to perform the process illustrated in FIG. 14. The operation of the control unit 1640 according to certain embodiments of the present disclosure will be described below.

The control unit 1640 measures received signal strengths with respect to the scanning beams of a serving base station and at least one neighboring base station. In this case, in order for the beam scanning, the control unit 1640 can perform a correlation operation between the previously known sequence of the scanning beam and a received signal, or perform detection without the correlation operation. In addition, the control unit 1640 determines whether there is a target beam of which the received signal strength is equal to or greater than a minimum value among the scanning beams of at least one neighboring base station. When there is the target beam, the control unit 1640 determines whether a received signal strength difference between a serving beam and the target beam is equal to or greater than a threshold value and, simultaneously whether a received signal strength difference between an active beam and the target beam is equal to or greater than a threshold value. In this case, whether the threshold value for the serving beam and the threshold value for the serving beam are identical to each other is determined according to a specific embodiment. When the received signal strength difference between the serving beam and the target beam is equal to or greater than the threshold value, and the received signal strength difference between the active beam and the target beam is equal to or greater than the threshold value, the handover determiner determines a handover to the target beam and transmits a request for handover to a node for performing control for handover.

In certain embodiments of the present disclosure, whether to perform the handover can be determined by a base station or a separate management server, not the terminal. In this case, after performing beam scanning, the control unit 1640 reports the results of beam scanning to a base station or a separate management server. In this case, reported information can include at least one of received signal strengths with respect to scanning beams or a result of comparison between the received signal strengths.

Figure 17:
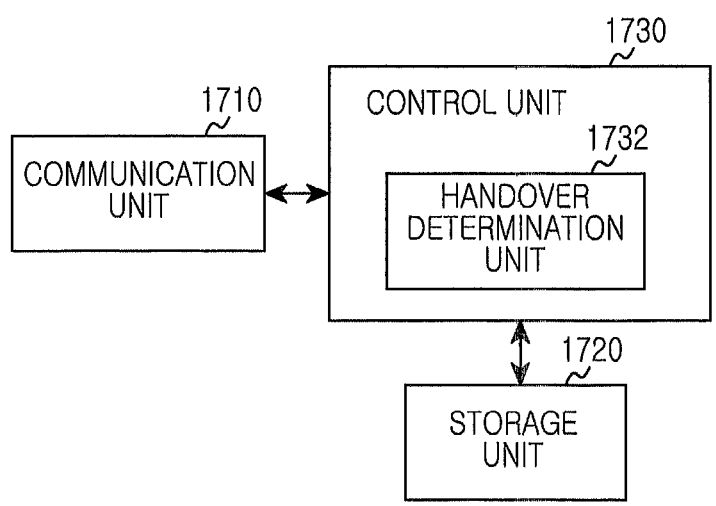
FIG. 17 illustrates a block configuration of a management server or a base station in a wireless communication system according to certain embodiments of the present disclosure.

FIG. 17 illustrates a block configuration of a management server or a base station in a wireless communication system according to certain embodiments of the present disclosure. FIG. 17 illustrates a block configuration of a node for determining a handover, which is a block configuration of a management server or base station. The apparatus illustrated in FIG. 17 is called "handover determiner" for convenience of description.

Referring to FIG. 17, the handover determiner includes a communication unit 1710, a storage unit 1720, and a control unit 1730.

The communication unit 1710 provides an interface for performing communication. For example, when the handover determiner is a base station, the communication unit 1710 includes a wireless interface for performing commutation with the terminal and a wired interface for performing communication with another node of the system. The wireless interface can include a modem, RF processing unit or the like. On the other hand, when the handover determiner is the management server, the communication unit includes a wired interface for performing communication with another node of the system.

The storage unit 1720 stores data, such as basic programs, application programs and setting information for the operation of the handover determiner. In addition, the storage unit 1720 provides stored data according to a request from the control unit 1730.

The control unit 1730 controls an overall operation of the handover determiner. For example, the control unit 1730 transmits and receives signals through the communication unit 1710. In addition, the control unit 1720 writes data to the storage unit 1720 and reads data from the storage unit 1720. In particular, the control unit 1730 includes a handover determination unit 1732 for determining whether to perform an inter-beam handover according to a result of beam scanning by a terminal. For example, the control unit 1730 enables the terminal to perform the process illustrated in FIG. 15. The operation of the control unit 1730 according to certain embodiments of the present disclosure will be described below.

The control unit 1730 receives a measurement report with respect to beam scanning performed by the terminal through the communication unit 1710. The measurement report can include at least one of received signal strengths with respect to scanning beams or a result of comparison between the received signal strengths. In addition, the control unit 1730 determines whether there is a target beam of which the received signal strength is equal to or greater than a minimum value among the scanning beams of at least one neighboring base station. When there is the target beam, the control unit 1730 determines whether a received signal strength difference between a serving beam and the target beam is equal to or greater than a threshold value and, simultaneously whether a received signal strength difference between an active beam and the target beam is equal to or greater than a threshold value. In this case, whether the threshold value for the serving beam and the threshold value for the serving beam are identical to each other is determined according to a specific embodiment. When the received signal strength difference between the serving beam and the target beam is equal to or greater than the threshold value, and the received signal strength difference between the active beam and the target beam is equal to or greater than the threshold value, the control unit 1730 determines a handover to the target beam and transmits a handover command to the terminal.

The present disclosure provides the inter-beam handover procedure considering beamforming, thereby performing an optimized handover in a system supporting beamforming.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain preferred embodiments thereof, it will be understood by those skilled in the art that various changes in form and details may be made therein without departing from the spirit and scope of the application as defined by the appended claims. Therefore, the scope of the application is defined not by the detailed description of the disclosure but by the appended claims, and all differences within the scope will be construed as being included in the present disclosure.

What is claimed is:

1. A method implemented using a terminal for a handover in a wireless communication system, the method comprising:
    performing measurement on a serving beam and an active beam from a serving base station, and a target beam from a neighboring base station;
    determining a handover to the target beam if a first value corresponding to a difference between a signal strength of the serving beam and a signal strength of the target beam is equal to or greater than a first threshold value, and a second value corresponding to a difference between a signal strength of the active beam and the signal strength of the target beam, is equal to or greater than a second threshold value; and
    transmitting a message to initiate the handover to the target beam in response to determining the handover to the target beam,
    wherein an identifier (ID) of the neighboring base station and an ID of the target beam are identified based on at least one of a sequence transmitted through the target beam and a position of a subcarrier corresponding to the target beam.

2. The method of claim 1, wherein the target beam has a greatest received signal strength among one or more beams from the neighboring base station.

3. The method of claim 1, further comprising measuring received signal strengths for scanned beams transmitted from the serving base station and measuring received signal strengths for scanned beams transmitted from the neighboring base station.

4. The method of claim 3, wherein the scanned beams transmitted from the serving base station and the scanned beams transmitted from the neighboring base station include a plurality of different scanned beam types having different beam widths.

5. The method of claim 3, further comprising receiving information necessary for the scanned beams, wherein the information necessary for the scanned beams includes at least one of: a period at which the scanned beams are transmitted, a frame number of a frame transmitting the scanned beams, a resource location transmitting the scanned beams, a number of scanned beam types, and a list of identifiers of the scanned beams.

6. The method of claim 3, wherein the scanned beams provide at least one of an identifier of a base station that transmits scanned beams and an identifier of the scanned beams.

7. The method of claim 3, further comprising updating a list of neighboring base stations, a list of beams of the neighboring base stations, and a list of active beams based on the measurements of the received signal strengths.

8. The method of claim 3, wherein the scanned beams transmitted from the neighboring base station have different beam widths, and wherein the scanned beams transmitted from the neighboring base station are transmitted according to an order based on the beam widths.

9. The method of claim 1, further comprising receiving a measurement report from the terminal representing results of received signal strengths for scanned beams transmitted from the serving base station and the scanned beams transmitted from the neighboring base station.

10. The method of claim 9, wherein the measurement report includes at least one of the received signal strengths for the scanned beams and a result of a comparison between the received signal strengths.

11. The method of claim 1, further comprising:
    storing an ID of a serving base station and an ID of a serving beam from the serving base station if a signal strength of the serving beam is equal to or greater than a third threshold value;
    storing the ID of a neighboring base station and the ID of a target beam from the neighboring base station if a signal strength of the serving beam is equal to or greater than a fourth threshold value; and
    transmitting information on the ID and the signal strength of the serving beam and the ID and the signal strength of the target beam to a management server.

12. An apparatus for a terminal in a wireless communication system, the apparatus comprising:
    a control unit configured to:
        perform measurement on a serving beam and an active beam from a serving base station, and a target beam from a neighboring base station; and
        determine a handover to the target beam if a first value corresponding to a difference between a signal strength of the serving beam and a signal strength of the target beam is equal to or greater than a first threshold value, and a second value corresponding to a difference between a signal strength of the active beam and the signal strength of the target beam, is equal to or greater than a second threshold value; and a communication unit configured to transmit a message to initiate the handover in response to determining the handover to the target beam, wherein an identifier (ID) of the neighboring base station and an ID of the target beam are identified based on at least one of a sequence transmitted through the target beam and a position of a subcarrier corresponding to the target beam.

13. The apparatus of claim 12, wherein the target beam has a greatest received signal strength among one or more beams from the neighboring base station.

14. The apparatus of claim 12, wherein the control unit is configured to measure received signal strengths for scanned beams transmitted from the serving base station and scanned beams transmitted from the neighboring base station.

15. The apparatus of claim 14, wherein the scanned beams transmitted from the serving base station and the scanned beams transmitted from the neighboring base station include a plurality of different scanned beam types having different beam widths.

16. The apparatus of claim 14, wherein the communication unit is configured to receive information necessary for the scanned beams, wherein the information necessary for the scanned beams includes at least one of a period at which the scanned beams are transmitted, a frame number of a frame transmitting the scanned beams, a resource location transmitting the scanned beams, a number of scanned beam types, and a list of identifiers of the scanned beams.

17. The apparatus of claim 14, wherein the scanned beams provide at least one of an identifier of a base station that transmits scanned beams and an identifier of the scanned beams.

18. The apparatus of claim 14, wherein the control unit is configured to update a list of neighboring base stations, a list of beams of the neighboring base stations, and a list of active beams based on the measurements of the received signal strengths.

19. The apparatus of claim 14, wherein the scanned beams transmitted from the neighboring base station have different beam widths, and wherein the scanned beams transmitted from the neighboring base station are transmitted according to an order based on the beam widths.

20. The apparatus of claim 12, wherein the communication unit is configured to receive a measurement report from the terminal representing results of received signal strengths for scanned beams transmitted from the serving base station and the scanned beams transmitted from the neighboring base station.

21. The apparatus of claim 20, wherein the measurement report includes at least one of the received signal strengths for the scanned beams and a result of a comparison between the received signal strengths.

22. The apparatus of claim 12, wherein the control unit is further configured to:

store an ID of a serving base station and an ID of a serving beam from the serving base station if a signal strength of the serving beam is equal to or greater than a third threshold value, and store the ID of a neighboring base station and the ID of a target beam from the neighboring base station if a signal strength of the target beam is equal to or greater than a fourth threshold value, and wherein the communication unit is further configured to transmit information on the ID and the signal strength of the serving beam and the ID and the signal strength of the target beam to a management server.

\* \* \* \* \*